(12) United States Patent
Agrawal et al.

(10) Patent No.: US 11,449,914 B2
(45) Date of Patent: Sep. 20, 2022

(54) SYSTEMS AND METHODS FOR VISUAL NAVIGATION DURING ONLINE SHOPPING USING INTELLIGENT FILTER SEQUENCING

(71) Applicant: Coupang Corp., Seoul (KR)

(72) Inventors: Nishant Agrawal, Sunnyvale, CA (US); Sung Ho Kim, Santa Clara, CA (US); Chan Seo, Seoul (KR); Ashutosh Pendse, Mountain View, CA (US); Min Hyun Park, Milpitas, CA (US); Bumho Lee, Gyeonggi-do (KR)

(73) Assignee: Coupang Corp., Seoul (KR)

( * ) Notice: Subject to any disclaimer, the term of this patent is extended or adjusted under 35 U.S.C. 154(b) by 0 days.

(21) Appl. No.: 17/008,567

(22) Filed: Aug. 31, 2020

(65) Prior Publication Data

US 2022/0067811 A1 Mar. 3, 2022

(51) Int. Cl.
*G06Q 30/00* (2012.01)
*G06Q 30/06* (2012.01)
(Continued)

(52) U.S. Cl.
CPC ..... *G06Q 30/0627* (2013.01); *G06F 16/2428* (2019.01); *G06F 16/24578* (2019.01); *G06F 16/9035* (2019.01); *G06Q 30/0643* (2013.01)

(58) Field of Classification Search
None
See application file for complete search history.

(56) References Cited

U.S. PATENT DOCUMENTS

| 6,507,836 | B1 * | 1/2003 | Nose | G06F 16/248 |
| | | | | 707/999.005 |
| 7,149,983 | B1 * | 12/2006 | Robertson | G06F 16/2428 |
| | | | | 715/810 |

(Continued)

FOREIGN PATENT DOCUMENTS

| CN | 107153697 A | 9/2017 |
| JP | 2005-100088 A | 1/2014 |

(Continued)

OTHER PUBLICATIONS

Sonkusare, S., Singhvi, M., Atkar, K., Kudu, N., E-commerce Shopping System with Semantic Search and Recommender System, Apr. 2020, International Research Journal of Engineering and Technology, vol. 07 Issue 04, pp. 2562-2566. (Year: 2020).*

(Continued)

*Primary Examiner* — Jeffrey A. Smith
*Assistant Examiner* — Brittany E Bargeon
(74) *Attorney, Agent, or Firm* — Finnegan, Henderson, Farabow, Garrett & Dunner, LLP

(57) ABSTRACT

One aspect of the present disclosure is directed to a computer-implemented method for streamlined product searching. The method may include receiving a search query comprising at least one keyword; generating a listing of related products based on the keyword; ranking each related product based on applicability; determining a product type of at least the highest ranking related product; determining a filter sequence associated with the product type; generating a first record comprising the filter sequence; instantiating a second record of selected attributes; displaying a first filter in the filter sequence; receiving a first selected attribute from the first filter; displaying the second filter; receiving a second selected attribute from the second filter; and display- (Continued)

ing a listing of products associated with the selected attributes in the second record.

19 Claims, 10 Drawing Sheets

(51) Int. Cl.
    *G06F 16/242*     (2019.01)
    *G06F 16/9035*     (2019.01)
    *G06F 16/2457*     (2019.01)

(56) References Cited

U.S. PATENT DOCUMENTS

| | | | |
|---|---|---|---|
| 8,515,830 | B1 | 8/2013 | Arora et al. |
| 2001/0003455 | A1* | 6/2001 | Grobler ............... G06F 16/2428 345/418 |
| 2006/0074879 | A1* | 4/2006 | Covington .......... G06F 16/2428 |
| 2010/0076979 | A1 | 3/2010 | Wang et al. |
| 2010/0235351 | A1* | 9/2010 | Iwasa ...................... G06F 16/78 707/723 |
| 2011/0202517 | A1 | 8/2011 | Reddy et al. |
| 2011/0276920 | A1* | 11/2011 | Fong ................... G06F 16/2423 715/810 |
| 2012/0246026 | A1* | 9/2012 | Xu ..................... G06Q 30/0641 705/26.63 |
| 2013/0036137 | A1 | 2/2013 | Ollis et al. |
| 2014/0172821 | A1* | 6/2014 | Hu ...................... G06F 16/9535 707/711 |
| 2014/0201647 | A1 | 7/2014 | Scherpa et al. |
| 2015/0205848 | A1* | 7/2015 | Kumar ................. G06F 16/904 707/754 |
| 2015/0356186 | A1* | 12/2015 | Konik ................. G06F 16/9038 707/706 |
| 2016/0004712 | A1 | 1/2016 | Rampson et al. |
| 2016/0012135 | A1* | 1/2016 | Wang ................. G06F 16/9535 707/731 |
| 2016/0125498 | A1* | 5/2016 | Setty .................. G06Q 30/0627 705/26.63 |
| 2016/0182617 | A1* | 6/2016 | Mengle ................... H04L 47/00 709/219 |
| 2016/0210321 | A1* | 7/2016 | Gong .................. H04N 21/4668 |
| 2017/0322971 | A1* | 11/2017 | Seshadri ............... G06F 16/338 |
| 2018/0218422 | A1* | 8/2018 | Gungor ............... G06F 16/9535 |
| 2018/0232450 | A1 | 8/2018 | Bivens et al. |
| 2018/0341709 | A1 | 11/2018 | Saklatvala |
| 2020/0019571 | A1* | 1/2020 | Frenkel ............... G06F 16/9032 |
| 2020/0183972 | A1 | 6/2020 | Kumar et al. |
| 2021/0049664 | A1* | 2/2021 | Lundgaard ......... G06Q 30/0627 |
| 2021/0118036 | A1* | 4/2021 | Jiang .................. G06Q 30/0627 |

FOREIGN PATENT DOCUMENTS

| | | |
|---|---|---|
| JP | 2014-501013 A | 1/2014 |
| KR | 10-2018-0098659 A | 9/2018 |
| TW | I518529 B | 1/2016 |

OTHER PUBLICATIONS

International Search Report and Written Opinion of the International Search Authority in International Application No. PCT/IB2021/050633 dated May 27, 2021 (11 pages).

Extended European Search Report in European Patent Application No. 20217974.3-1213 dated Jun. 14, 2021 (7 pages).

Notice of Allowance, dated May 3, 2022, issued by the Taiwan Intellectual Property Office in counterpart Taiwanese Application No. 110100199, 4 pages.

Notice of Preliminary Rejection dated Dec. 16, 2021, by the Korean Intellectual Property Office in counterpart Korean Application No. 10-2020-0181282, 16 pages.

Notice of Final Rejection, dated Jun. 2, 2022, by the Korean Intellectual Property Office in counterpart Korean Application No. 10-2020-0181282, 8 pages.

\* cited by examiner

SYSTEMS AND METHODS FOR VISUAL NAVIGATION DURING ONLINE SHOPPING USING INTELLIGENT FILTER SEQUENCING

TECHNICAL FIELD

The present disclosure generally relates to computerized systems and methods for streamlined product searching. In particular, embodiments of the present disclosure relate to inventive and unconventional systems for providing visual navigation during online shopping using intelligent filter sequencing.

BACKGROUND

Conventional online shopping platforms allow customers to shop for items using a searching tool to find desired products. Generally, the customer will enter a keyword into a search bar or select a category of products to begin the online shopping process. At this point, an online shopping portal may present a large quantity of related products that may be overwhelming to the customer. Often times, online shopping portals employ the option to filter search results by certain attributes, such as price, brand, sizes, product types, product subtypes, and other specifications in order to narrow search results.

In addition to generating a large amount of search results, broad search queries (e.g., 'laptop', 'tv', etc.) may result in displaying a large amount of attribute filters that the customer may choose from, which may also be overwhelming. Furthermore, conventional presentation of filtering options do not provide enough context for the filters to enable the customer to understand their importance. Additionally, the large amount of filters may provide access problems on mobile platforms, as they may not be easy for the customer to find due the space constraints on mobile devices. As a result of these issues, engagement rates with conventional search filtering systems are low and thus may not aide customers in their online shopping as optimally as intended.

Therefore, there is a need for improved methods and systems for enabling product navigation by streamlining the selection of attribute filters and reducing the cognitive load experienced by customers during their online shopping experience.

SUMMARY

One aspect of the present disclosure is directed to a computer-implemented system for streamlined product searching. The system may include: a memory storing instructions; and at least one processor configured to execute the instructions to: receive, from a user device, a search query comprising at least one keyword; generating a listing of related products based on the keyword; ranking each related product based on applicability; determining a product type of at least the highest ranking related product; determine a filter sequence associated with the product type, the filter sequence comprising an order of filters; generate a first record comprising the filter sequence, and store the first record in at least one data structure; instantiating a second record of selected attributes, and store the second record in the at least one data structure; display, on the user device, a first filter in the filter sequence comprising a first plurality of selectable attributes; receive, from the user device, a first selected attribute from the first filter; delete the first filter from the first record; insert the first selected attribute in the second record; determine, based on consulting the first and second records, whether a second filter in the filter sequence meets the condition for display; if the second filter meets the condition for display: display on the user device, the second filter comprising a second plurality of selectable attributes; receive, from the user device, a second selected attribute from the second filter; delete the first filter from the first record; and insert the second selected attribute in the second record; and display, on the user device, a listing of products associated with the selected attributes in the second record.

Another aspect of the present disclosure is directed to a method for streamlined product searching, comprising: receiving, from a user device, a search query comprising at least one keyword; generating a listing of related products based on the keyword; ranking each related product based on applicability; determining a product type of at least the highest ranking related product; determining a filter sequence associated with the product type, the filter sequence comprising an order of filters; generating a first record comprising the filter sequence, and store the first record in at least one data structure; instantiating a second record of selected attributes, and store the second record in the at least one data structure; displaying, on the user device, a first filter in the filter sequence comprising a first plurality of selectable attributes; receiving, from the user device, a first selected attribute from the first filter; deleting the first filter from the first record; inserting the first selected attribute in the second record; determining, based on consulting the first and second records, whether a second filter in the filter sequence meets the condition for display; if the second filter meets the condition for display: displaying on the user device, the second filter comprising a second plurality of selectable attributes; receiving, from the user device, a second selected attribute from the second filter; deleting the first filter from the first record; and inserting the second selected attribute in the second record; and displaying, on the user device, a listing of products associated with the selected attributes in the second record.

Yet another aspect of the present disclosure is directed to a computer-implemented system for streamlined product searching, the system comprising: a memory storing instructions; and at least one processor configured to execute the instructions to: receive, from a user device, a search query comprising at least one keyword; retrieving, in the at least one data structure, historical query data associated with the at least one keyword, the historical query data comprising an engagement rate associated with each related product; ranking each related product based on the engagement rates associated with each related product; determining a product type of at least the highest ranking related product; retrieving, from the at least one database, historical filter data for a plurality of filters comprising: an engagement rate for each filter in the plurality of filters; and a query rate for a plurality of attributes associated with each filter in the plurality of filters; and generating the order of filters based on the historical filter data generate a first record comprising the filter sequence, and store the first record in at least one data structure; instantiating a second record of selected attributes, and store the second record in the at least one data structure; display, on the user device, a first filter in the filter sequence comprising a first plurality of selectable attributes; receive, from the user device, a first selected attribute from the first filter; delete the first filter from the first record; insert the first selected attribute in the second record; determine, based on consulting the first and second records, if a second filter in the filter sequence exists; and determining if a plurality of available attributes in the second filter exists; if the second filter and the at least one available attribute exist: display on the user device, the second filter comprising a second plurality of selectable attributes, and receive, from the user device, a second selected attribute from the second filter; delete the first filter from the first record; and insert the second selected attribute in the second record; and display, on the user device, a listing of products associated with the selected attributes in the second record.

Other systems, methods, and computer-readable media are also discussed herein.

DETAILED DESCRIPTION

Figure 1A:
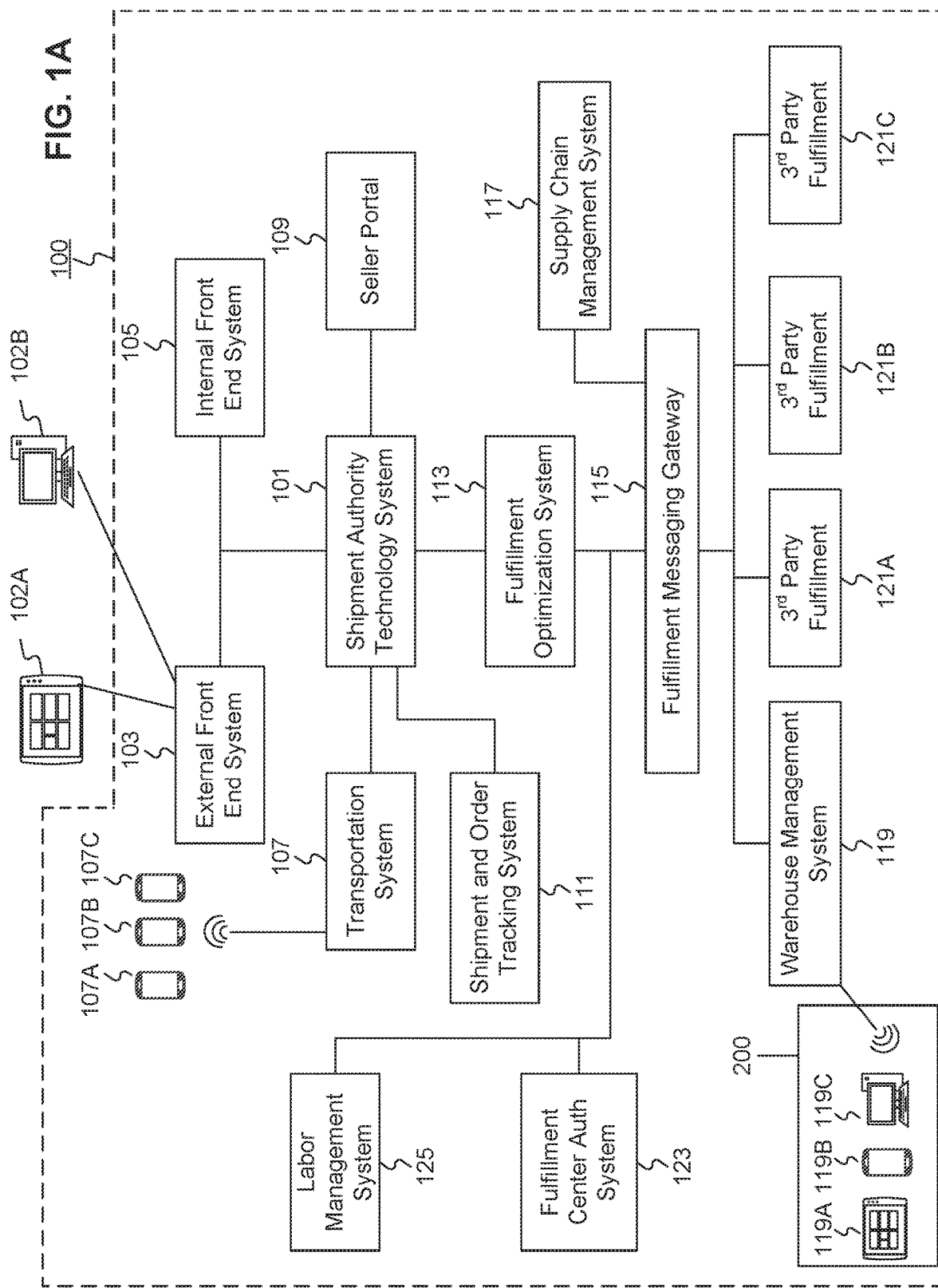
FIG. 1A is a schematic block diagram illustrating an exemplary embodiment of a network comprising computerized systems for communications enabling shipping, transportation, and logistics operations, consistent with the disclosed embodiments.
Figure 1B:
FIG. 1B depicts a sample Search Result Page (SRP) that includes one or more search results satisfying a search request along with interactive user interface elements, consistent with the disclosed embodiments.
Figure 1C:
FIG. 1C depicts a sample Single Detail Page (SDP) that includes a product and information about the product along with interactive user interface elements, consistent with the disclosed embodiments.

The following detailed description refers to the accompanying drawings. Wherever possible, the same reference numbers are used in the drawings and the following description to refer to the same or similar parts. While several illustrative embodiments are described herein, modifications, adaptations and other implementations are possible. For example, substitutions, additions, or modifications may be made to the components and steps illustrated in the drawings, and the illustrative methods described herein may be modified by substituting, reordering, removing, or adding steps to the disclosed methods. Accordingly, the following detailed description is not limited to the disclosed embodiments and examples. Instead, the proper scope of the invention is defined by the appended claims.

Embodiments of the present disclosure are directed to systems and methods configured for providing visual navigation during online shopping using intelligent filter sequencing.

Referring to FIG. 1A, a schematic block diagram 100 illustrating an exemplary embodiment of a system comprising computerized systems for communications enabling shipping, transportation, and logistics operations is shown. As illustrated in FIG. 1A, system 100 may include a variety of systems, each of which may be connected to one another via one or more networks. The systems may also be connected to one another via a direct connection, for example, using a cable. The depicted systems include a shipment authority technology (SAT) system 101, an external front end system 103, an internal front end system 105, a transportation system 107, mobile devices 107A, 107B, and 107C, seller portal 109, shipment and order tracking (SOT) system 111, fulfillment optimization (FO) system 113, fulfillment messaging gateway (FMG) 115, supply chain management (SCM) system 117, warehouse management system 119, mobile devices 119A, 119B, and 119C (depicted as being inside of fulfillment center (FC) 200), $3^{rd}$ party fulfillment systems 121A, 121B, and 121C, fulfillment center authorization system (FC Auth) 123, and labor management system (LMS) 125.

SAT system 101, in some embodiments, may be implemented as a computer system that monitors order status and delivery status. For example, SAT system 101 may determine whether an order is past its Promised Delivery Date (PDD) and may take appropriate action, including initiating a new order, reshipping the items in the non-delivered order, canceling the non-delivered order, initiating contact with the ordering customer, or the like. SAT system 101 may also monitor other data, including output (such as a number of packages shipped during a particular time period) and input (such as the number of empty cardboard boxes received for use in shipping). SAT system 101 may also act as a gateway between different devices in system 100, enabling communication (e.g., using store-and-forward or other techniques) between devices such as external front end system 103 and FO system 113.

External front end system 103, in some embodiments, may be implemented as a computer system that enables external users to interact with one or more systems in system 100. For example, in embodiments where system 100 enables the presentation of systems to enable users to place an order for an item, external front end system 103 may be implemented as a web server that receives search requests, presents item pages, and solicits payment information. For example, external front end system 103 may be implemented as a computer or computers running software such as the Apache HTTP Server, Microsoft Internet Information Services (IIS), NGINX, or the like. In other embodiments, external front end system 103 may run custom web server software designed to receive and process requests from external devices (e.g., mobile device 102A or computer 102B), acquire information from databases and other data stores based on those requests, and provide responses to the received requests based on acquired information.

In some embodiments, external front end system 103 may include one or more of a web caching system, a database, a search system, or a payment system. In one aspect, external front end system 103 may comprise one or more of these systems, while in another aspect, external front end system 103 may comprise interfaces (e.g., server-to-server, database-to-database, or other network connections) connected to one or more of these systems.

An illustrative set of steps, illustrated by FIGS. 1B, 1C, 1D, and 1E, will help to describe some operations of external front end system 103. External front end system 103 may receive information from systems or devices in system 100 for presentation and/or display. For example, external front end system 103 may host or provide one or more web pages, including a Search Result Page (SRP) (e.g., FIG. 1B), a Single Detail Page (SDP) (e.g., FIG. 1C), a Cart page (e.g., FIG. 1D), or an Order page (e.g., FIG. 1E). A user device (e.g., using mobile device 102A or computer 102B) may navigate to external front end system 103 and request a search by entering information into a search box. External front end system 103 may request information from one or more systems in system 100. For example, external front end system 103 may request information from FO System 113 that satisfies the search request. External front end system 103 may also request and receive (from FO System 113) a Promised Delivery Date or "PDD" for each product included in the search results. The PDD, in some embodiments, may represent an estimate of when a package containing the product will arrive at the user's desired location or a date by which the product is promised to be delivered at the user's desired location if ordered within a particular period of time, for example, by the end of the day (11:59 PM). (PDD is discussed further below with respect to FO System 113.)

External front end system 103 may prepare an SRP (e.g., FIG. 1B) based on the information. The SRP may include information that satisfies the search request. For example, this may include pictures of products that satisfy the search request. The SRP may also include respective prices for each product, or information relating to enhanced delivery options for each product, PDD, weight, size, offers, discounts, or the like. External front end system 103 may send the SRP to the requesting user device (e.g., via a network).

A user device may then select a product from the SRP, e.g., by clicking or tapping a user interface, or using another input device, to select a product represented on the SRP. The user device may formulate a request for information on the selected product and send it to external front end system 103. In response, external front end system 103 may request information related to the selected product. For example, the information may include additional information beyond that presented for a product on the respective SRP. This could include, for example, shelf life, country of origin, weight, size, number of items in package, handling instructions, or other information about the product. The information could also include recommendations for similar products (based on, for example, big data and/or machine learning analysis of customers who bought this product and at least one other product), answers to frequently asked questions, reviews from customers, manufacturer information, pictures, or the like.

External front end system 103 may prepare an SDP (Single Detail Page) (e.g., FIG. 1C) based on the received product information. The SDP may also include other interactive elements such as a "Buy Now" button, a "Add to Cart" button, a quantity field, a picture of the item, or the like. The SDP may further include a list of sellers that offer the product. The list may be ordered based on the price each seller offers such that the seller that offers to sell the product at the lowest price may be listed at the top. The list may also be ordered based on the seller ranking such that the highest ranked seller may be listed at the top. The seller ranking may be formulated based on multiple factors, including, for example, the seller's past track record of meeting a promised PDD. External front end system 103 may deliver the SDP to the requesting user device (e.g., via a network).

The requesting user device may receive the SDP which lists the product information. Upon receiving the SDP, the user device may then interact with the SDP. For example, a user of the requesting user device may click or otherwise interact with a "Place in Cart" button on the SDP. This adds the product to a shopping cart associated with the user. The user device may transmit this request to add the product to the shopping cart to external front end system 103.

Figure 1D:
FIG. 1D depicts a sample Cart page that includes items in a virtual shopping cart along with interactive user interface elements, consistent with the disclosed embodiments.
Figure 1E:
FIG. 1E depicts a sample Order page that includes items from the virtual shopping cart along with information regarding purchase and shipping, along with interactive user interface elements, consistent with the disclosed embodiments.

External front end system 103 may generate a Cart page (e.g., FIG. 1D). The Cart page, in some embodiments, lists the products that the user has added to a virtual "shopping cart." A user device may request the Cart page by clicking on or otherwise interacting with an icon on the SRP, SDP, or other pages. The Cart page may, in some embodiments, list all products that the user has added to the shopping cart, as well as information about the products in the cart such as a quantity of each product, a price for each product per item, a price for each product based on an associated quantity, information regarding PDD, a delivery method, a shipping cost, user interface elements for modifying the products in the shopping cart (e.g., deletion or modification of a quantity), options for ordering other product or setting up periodic delivery of products, options for setting up interest payments, user interface elements for proceeding to purchase, or the like. A user at a user device may click on or otherwise interact with a user interface element (e.g., a button that reads "Buy Now") to initiate the purchase of the product in the shopping cart. Upon doing so, the user device may transmit this request to initiate the purchase to external front end system 103.

External front end system 103 may generate an Order page (e.g., FIG. 1E) in response to receiving the request to initiate a purchase. The Order page, in some embodiments, re-lists the items from the shopping cart and requests input of payment and shipping information. For example, the Order page may include a section requesting information about the purchaser of the items in the shopping cart (e.g., name, address, e-mail address, phone number), information about the recipient (e.g., name, address, phone number, delivery information), shipping information (e.g., speed/method of delivery and/or pickup), payment information (e.g., credit card, bank transfer, check, stored credit), user interface elements to request a cash receipt (e.g., for tax purposes), or the like. External front end system 103 may send the Order page to the user device.

The user device may enter information on the Order page and click or otherwise interact with a user interface element that sends the information to external front end system 103. From there, external front end system 103 may send the information to different systems in system 100 to enable the creation and processing of a new order with the products in the shopping cart.

In some embodiments, external front end system 103 may be further configured to enable sellers to transmit and receive information relating to orders.

Internal front end system 105, in some embodiments, may be implemented as a computer system that enables internal users (e.g., employees of an organization that owns, operates, or leases system 100) to interact with one or more systems in system 100. For example, in embodiments where system 100 enables the presentation of systems to enable users to place an order for an item, internal front end system 105 may be implemented as a web server that enables internal users to view diagnostic and statistical information about orders, modify item information, or review statistics relating to orders. For example, internal front end system 105 may be implemented as a computer or computers running software such as the Apache HTTP Server, Microsoft Internet Information Services (IIS), NGINX, or the like. In other embodiments, internal front end system 105 may run custom web server software designed to receive and process requests from systems or devices depicted in system 100 (as well as other devices not depicted), acquire information from databases and other data stores based on those requests, and provide responses to the received requests based on acquired information.

In some embodiments, internal front end system 105 may include one or more of a web caching system, a database, a search system, a payment system, an analytics system, an order monitoring system, or the like. In one aspect, internal front end system 105 may comprise one or more of these systems, while in another aspect, internal front end system 105 may comprise interfaces (e.g., server-to-server, database-to-database, or other network connections) connected to one or more of these systems.

Transportation system 107, in some embodiments, may be implemented as a computer system that enables communication between systems or devices in system 100 and mobile devices 107A-107C. Transportation system 107, in some embodiments, may receive information from one or more mobile devices 107A-107C (e.g., mobile phones, smart phones, PDAs, or the like). For example, in some embodiments, mobile devices 107A-107C may comprise devices operated by delivery workers. The delivery workers, who may be permanent, temporary, or shift employees, may utilize mobile devices 107A-107C to effect delivery of packages containing the products ordered by users. For example, to deliver a package, the delivery worker may receive a notification on a mobile device indicating which package to deliver and where to deliver it. Upon arriving at the delivery location, the delivery worker may locate the package (e.g., in the back of a truck or in a crate of packages), scan or otherwise capture data associated with an identifier on the package (e.g., a barcode, an image, a text string, an RFID tag, or the like) using the mobile device, and deliver the package (e.g., by leaving it at a front door, leaving it with a security guard, handing it to the recipient, or the like). In some embodiments, the delivery worker may capture photo(s) of the package and/or may obtain a signature using the mobile device. The mobile device may send information to transportation system 107 including information about the delivery, including, for example, time, date, GPS location, photo(s), an identifier associated with the delivery worker, an identifier associated with the mobile device, or the like. Transportation system 107 may store this information in a database (not pictured) for access by other systems in system 100. Transportation system 107 may, in some embodiments, use this information to prepare and send tracking data to other systems indicating the location of a particular package.

In some embodiments, certain users may use one kind of mobile device (e.g., permanent workers may use a specialized PDA with custom hardware such as a barcode scanner, stylus, and other devices) while other users may use other kinds of mobile devices (e.g., temporary or shift workers may utilize off-the-shelf mobile phones and/or smartphones).

In some embodiments, transportation system 107 may associate a user with each device. For example, transportation system 107 may store an association between a user (represented by, e.g., a user identifier, an employee identifier, or a phone number) and a mobile device (represented by, e.g., an International Mobile Equipment Identity (IMEI), an International Mobile Subscription Identifier (IMSI), a phone number, a Universal Unique Identifier (UUID), or a Globally Unique Identifier (GUID)). Transportation system 107 may use this association in conjunction with data received on deliveries to analyze data stored in the database in order to determine, among other things, a location of the worker, an efficiency of the worker, or a speed of the worker.

Seller portal 109, in some embodiments, may be implemented as a computer system that enables sellers or other external entities to electronically communicate with one or more systems in system 100. For example, a seller may utilize a computer system (not pictured) to upload or provide product information, order information, contact information, or the like, for products that the seller wishes to sell through system 100 using seller portal 109.

Shipment and order tracking system 111, in some embodiments, may be implemented as a computer system that receives, stores, and forwards information regarding the location of packages containing products ordered by customers (e.g., by a user using devices 102A-102B). In some embodiments, shipment and order tracking system 111 may request or store information from web servers (not pictured) operated by shipping companies that deliver packages containing products ordered by customers.

In some embodiments, shipment and order tracking system 111 may request and store information from systems depicted in system 100. For example, shipment and order tracking system 111 may request information from transportation system 107. As discussed above, transportation system 107 may receive information from one or more mobile devices 107A-107C (e.g., mobile phones, smart phones, PDAs, or the like) that are associated with one or more of a user (e.g., a delivery worker) or a vehicle (e.g., a delivery truck). In some embodiments, shipment and order tracking system 111 may also request information from warehouse management system (WMS) 119 to determine the location of individual products inside of a fulfillment center (e.g., fulfillment center 200). Shipment and order tracking system 111 may request data from one or more of transportation system 107 or WMS 119, process it, and present it to a device (e.g., user devices 102A and 102B) upon request.

Fulfillment optimization (FO) system 113, in some embodiments, may be implemented as a computer system that stores information for customer orders from other systems (e.g., external front end system 103 and/or shipment and order tracking system 111). FO system 113 may also store information describing where particular items are held or stored. For example, certain items may be stored only in one fulfillment center, while certain other items may be stored in multiple fulfillment centers. In still other embodiments, certain fulfilment centers may be designed to store only a particular set of items (e.g., fresh produce or frozen products). FO system 113 stores this information as well as associated information (e.g., quantity, size, date of receipt, expiration date, etc.).

FO system 113 may also calculate a corresponding PDD (promised delivery date) for each product. The PDD, in some embodiments, may be based on one or more factors. For example, FO system 113 may calculate a PDD for a product based on a past demand for a product (e.g., how many times that product was ordered during a period of time), an expected demand for a product (e.g., how many customers are forecast to order the product during an upcoming period of time), a network-wide past demand indicating how many products were ordered during a period of time, a network-wide expected demand indicating how many products are expected to be ordered during an upcoming period of time, one or more counts of the product stored in each fulfillment center 200, which fulfillment center stores each product, expected or current orders for that product, or the like.

In some embodiments, FO system 113 may determine a PDD for each product on a periodic basis (e.g., hourly) and store it in a database for retrieval or sending to other systems (e.g., external front end system 103, SAT system 101, shipment and order tracking system 111). In other embodiments, FO system 113 may receive electronic requests from one or more systems (e.g., external front end system 103, SAT system 101, shipment and order tracking system 111) and calculate the PDD on demand.

Fulfilment messaging gateway (FMG) 115, in some embodiments, may be implemented as a computer system that receives a request or response in one format or protocol from one or more systems in system 100, such as FO system 113, converts it to another format or protocol, and forward it in the converted format or protocol to other systems, such as WMS 119 or $3^{rd}$ party fulfillment systems 121A, 121B, or 121C, and vice versa.

Supply chain management (SCM) system 117, in some embodiments, may be implemented as a computer system that performs forecasting functions. For example, SCM system 117 may forecast a level of demand for a particular product based on, for example, based on a past demand for products, an expected demand for a product, a network-wide past demand, a network-wide expected demand, a count products stored in each fulfillment center 200, expected or current orders for each product, or the like. In response to this forecasted level and the amount of each product across all fulfillment centers, SCM system 117 may generate one or more purchase orders to purchase and stock a sufficient quantity to satisfy the forecasted demand for a particular product.

Warehouse management system (WMS) 119, in some embodiments, may be implemented as a computer system that monitors workflow. For example, WMS 119 may receive event data from individual devices (e.g., devices 107A-107C or 119A-119C) indicating discrete events. For example, WMS 119 may receive event data indicating the use of one of these devices to scan a package. As discussed below with respect to fulfillment center 200 and FIG. 2, during the fulfillment process, a package identifier (e.g., a barcode or RFID tag data) may be scanned or read by machines at particular stages (e.g., automated or handheld barcode scanners, RFID readers, high-speed cameras, devices such as tablet 119A, mobile device/PDA 119B, computer 119C, or the like). WMS 119 may store each event indicating a scan or a read of a package identifier in a corresponding database (not pictured) along with the package identifier, a time, date, location, user identifier, or other information, and may provide this information to other systems (e.g., shipment and order tracking system 111).

WMS 119, in some embodiments, may store information associating one or more devices (e.g., devices 107A-107C or 119A-119C) with one or more users associated with system 100. For example, in some situations, a user (such as a part- or full-time employee) may be associated with a mobile device in that the user owns the mobile device (e.g., the mobile device is a smartphone). In other situations, a user may be associated with a mobile device in that the user is temporarily in custody of the mobile device (e.g., the user checked the mobile device out at the start of the day, will use it during the day, and will return it at the end of the day).

WMS 119, in some embodiments, may maintain a work log for each user associated with system 100. For example, WMS 119 may store information associated with each employee, including any assigned processes (e.g., unloading trucks, picking items from a pick zone, rebin wall work, packing items), a user identifier, a location (e.g., a floor or zone in a fulfillment center 200), a number of units moved through the system by the employee (e.g., number of items picked, number of items packed), an identifier associated with a device (e.g., devices 119A-119C), or the like. In some embodiments, WMS 119 may receive check-in and check-out information from a timekeeping system, such as a timekeeping system operated on a device 119A-119C.

$3^{rd}$ party fulfillment (3PL) systems 121A-121C, in some embodiments, represent computer systems associated with third-party providers of logistics and products. For example, while some products are stored in fulfillment center 200 (as discussed below with respect to FIG. 2), other products may be stored off-site, may be produced on demand, or may be otherwise unavailable for storage in fulfillment center 200. 3PL systems 121A-121C may be configured to receive orders from FO system 113 (e.g., through FMG 115) and may provide products and/or services (e.g., delivery or installation) to customers directly. In some embodiments, one or more of 3PL systems 121A-121C may be part of system 100, while in other embodiments, one or more of 3PL systems 121A-121C may be outside of system 100 (e.g., owned or operated by a third-party provider).

Fulfillment Center Auth system (FC Auth) 123, in some embodiments, may be implemented as a computer system with a variety of functions. For example, in some embodiments, FC Auth 123 may act as a single-sign on (SSO) service for one or more other systems in system 100. For example, FC Auth 123 may enable a user to log in via internal front end system 105, determine that the user has similar privileges to access resources at shipment and order tracking system 111, and enable the user to access those privileges without requiring a second log in process. FC Auth 123, in other embodiments, may enable users (e.g., employees) to associate themselves with a particular task. For example, some employees may not have an electronic device (such as devices 119A-119C) and may instead move from task to task, and zone to zone, within a fulfillment center 200, during the course of a day. FC Auth 123 may be configured to enable those employees to indicate what task they are performing and what zone they are in at different times of day.

Labor management system (LMS) 125, in some embodiments, may be implemented as a computer system that stores attendance and overtime information for employees (including full-time and part-time employees). For example, LMS 125 may receive information from FC Auth 123, WMS 119, devices 119A-119C, transportation system 107, and/or devices 107A-107C.

The particular configuration depicted in FIG. 1A is an example only. For example, while FIG. 1A depicts FC Auth system 123 connected to FO system 113, not all embodiments require this particular configuration. Indeed, in some embodiments, the systems in system 100 may be connected to one another through one or more public or private networks, including the Internet, an Intranet, a WAN (Wide-Area Network), a MAN (Metropolitan-Area Network), a wireless network compliant with the IEEE 802.11a/b/g/n Standards, a leased line, or the like. In some embodiments, one or more of the systems in system 100 may be implemented as one or more virtual servers implemented at a data center, server farm, or the like.

Figure 2:
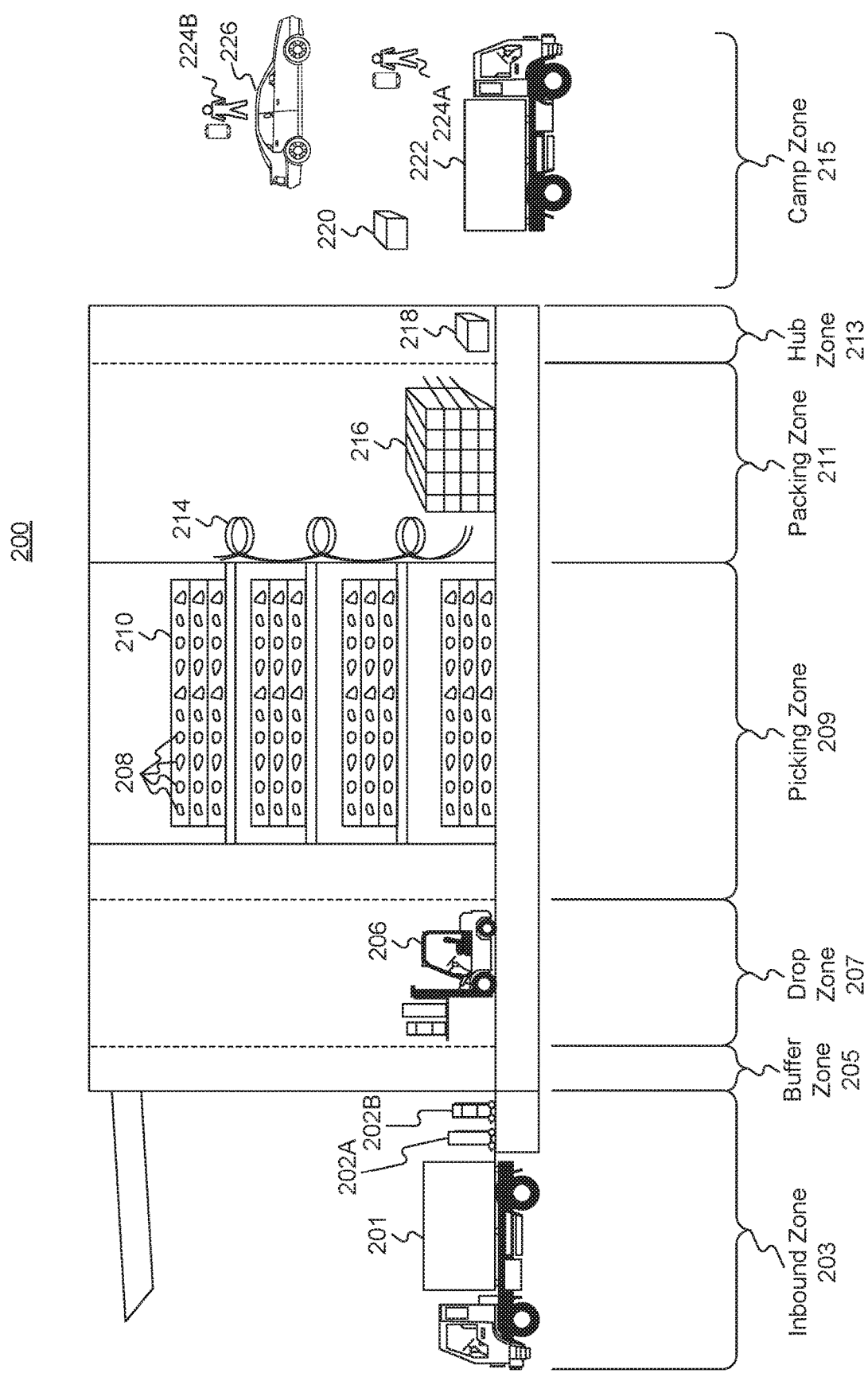
FIG. 2 is a diagrammatic illustration of an exemplary fulfillment center configured to utilize disclosed computerized systems, consistent with the disclosed embodiments.

FIG. 2 depicts a fulfillment center 200. Fulfillment center 200 is an example of a physical location that stores items for shipping to customers when ordered. Fulfillment center (FC) 200 may be divided into multiple zones, each of which are depicted in FIG. 2. These "zones," in some embodiments, may be thought of as virtual divisions between different stages of a process of receiving items, storing the items, retrieving the items, and shipping the items. So while the "zones" are depicted in FIG. 2, other divisions of zones are possible, and the zones in FIG. 2 may be omitted, duplicated, or modified in some embodiments.

Inbound zone 203 represents an area of FC 200 where items are received from sellers who wish to sell products using system 100 from FIG. 1A. For example, a seller may deliver items 202A and 202B using truck 201. Item 202A may represent a single item large enough to occupy its own shipping pallet, while item 202B may represent a set of items that are stacked together on the same pallet to save space.

A worker will receive the items in inbound zone 203 and may optionally check the items for damage and correctness using a computer system (not pictured). For example, the worker may use a computer system to compare the quantity of items 202A and 202B to an ordered quantity of items. If the quantity does not match, that worker may refuse one or more of items 202A or 202B. If the quantity does match, the worker may move those items (using, e.g., a dolly, a handtruck, a forklift, or manually) to buffer zone 205. Buffer zone 205 may be a temporary storage area for items that are not currently needed in the picking zone, for example, because there is a high enough quantity of that item in the picking zone to satisfy forecasted demand. In some embodiments, forklifts 206 operate to move items around buffer zone 205 and between inbound zone 203 and drop zone 207. If there is a need for items 202A or 202B in the picking zone (e.g., because of forecasted demand), a forklift may move items 202A or 202B to drop zone 207.

Drop zone 207 may be an area of FC 200 that stores items before they are moved to picking zone 209. A worker assigned to the picking task (a "picker") may approach items 202A and 202B in the picking zone, scan a barcode for the picking zone, and scan barcodes associated with items 202A and 202B using a mobile device (e.g., device 119B). The picker may then take the item to picking zone 209 (e.g., by placing it on a cart or carrying it).

Picking zone 209 may be an area of FC 200 where items 208 are stored on storage units 210. In some embodiments, storage units 210 may comprise one or more of physical shelving, bookshelves, boxes, totes, refrigerators, freezers, cold stores, or the like. In some embodiments, picking zone 209 may be organized into multiple floors. In some embodiments, workers or machines may move items into picking zone 209 in multiple ways, including, for example, a forklift, an elevator, a conveyor belt, a cart, a handtruck, a dolly, an automated robot or device, or manually. For example, a picker may place items 202A and 202B on a handtruck or cart in drop zone 207 and walk items 202A and 202B to picking zone 209.

A picker may receive an instruction to place (or "stow") the items in particular spots in picking zone 209, such as a particular space on a storage unit 210. For example, a picker may scan item 202A using a mobile device (e.g., device 119B). The device may indicate where the picker should stow item 202A, for example, using a system that indicate an aisle, shelf, and location. The device may then prompt the picker to scan a barcode at that location before stowing item 202A in that location. The device may send (e.g., via a wireless network) data to a computer system such as WMS 119 in FIG. 1A indicating that item 202A has been stowed at the location by the user using device 1198.

Once a user places an order, a picker may receive an instruction on device 1198 to retrieve one or more items 208 from storage unit 210. The picker may retrieve item 208, scan a barcode on item 208, and place it on transport mechanism 214. While transport mechanism 214 is represented as a slide, in some embodiments, transport mechanism may be implemented as one or more of a conveyor belt, an elevator, a cart, a forklift, a handtruck, a dolly, a cart, or the like. Item 208 may then arrive at packing zone 211.

Packing zone 211 may be an area of FC 200 where items are received from picking zone 209 and packed into boxes or bags for eventual shipping to customers. In packing zone 211, a worker assigned to receiving items (a "rebin worker") will receive item 208 from picking zone 209 and determine what order it corresponds to. For example, the rebin worker may use a device, such as computer 119C, to scan a barcode on item 208. Computer 119C may indicate visually which order item 208 is associated with. This may include, for example, a space or "cell" on a wall 216 that corresponds to an order. Once the order is complete (e.g., because the cell contains all items for the order), the rebin worker may indicate to a packing worker (or "packer") that the order is complete. The packer may retrieve the items from the cell and place them in a box or bag for shipping. The packer may then send the box or bag to a hub zone 213, e.g., via forklift, cart, dolly, handtruck, conveyor belt, manually, or otherwise.

Hub zone 213 may be an area of FC 200 that receives all boxes or bags ("packages") from packing zone 211. Workers and/or machines in hub zone 213 may retrieve package 218 and determine which portion of a delivery area each package is intended to go to, and route the package to an appropriate camp zone 215. For example, if the delivery area has two smaller sub-areas, packages will go to one of two camp zones 215. In some embodiments, a worker or machine may scan a package (e.g., using one of devices 119A-119C) to determine its eventual destination. Routing the package to camp zone 215 may comprise, for example, determining a portion of a geographical area that the package is destined for (e.g., based on a postal code) and determining a camp zone 215 associated with the portion of the geographical area.

Camp zone 215, in some embodiments, may comprise one or more buildings, one or more physical spaces, or one or more areas, where packages are received from hub zone 213 for sorting into routes and/or sub-routes. In some embodiments, camp zone 215 is physically separate from FC 200 while in other embodiments camp zone 215 may form a part of FC 200.

Workers and/or machines in camp zone 215 may determine which route and/or sub-route a package 220 should be associated with, for example, based on a comparison of the destination to an existing route and/or sub-route, a calculation of workload for each route and/or sub-route, the time of day, a shipping method, the cost to ship the package 220, a PDD associated with the items in package 220, or the like. In some embodiments, a worker or machine may scan a package (e.g., using one of devices 119A-119C) to determine its eventual destination. Once package 220 is assigned to a particular route and/or sub-route, a worker and/or machine may move package 220 to be shipped. In exemplary FIG. 2, camp zone 215 includes a truck 222, a car 226, and delivery workers 224A and 224B. In some embodiments, truck 222 may be driven by delivery worker 224A, where delivery worker 224A is a full-time employee that delivers packages for FC 200 and truck 222 is owned, leased, or operated by the same company that owns, leases, or operates FC 200. In some embodiments, car 226 may be driven by delivery worker 224B, where delivery worker 224B is a "flex" or occasional worker that is delivering on an as-needed basis (e.g., seasonally). Car 226 may be owned, leased, or operated by delivery worker 224B.

Figure 3:
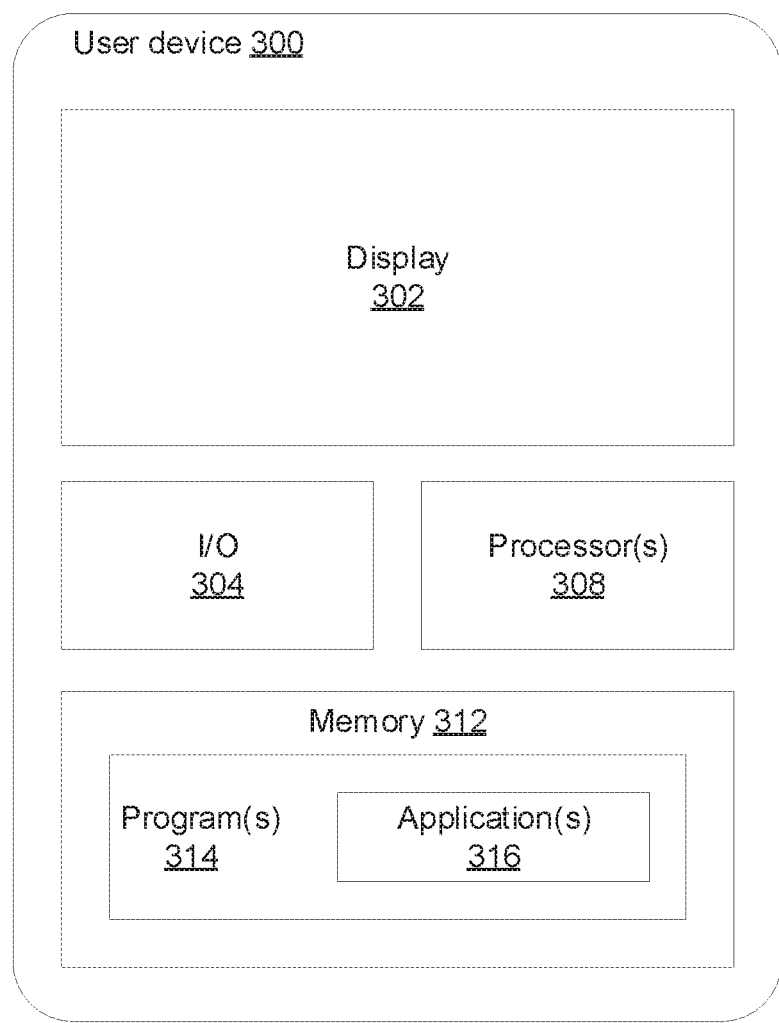
FIG. 3 is a block diagram of an exemplary user device, consistent with disclosed embodiments.

FIG. 3 shows an exemplary configuration of user device 300, consistent with disclosed embodiments. User device 300 of FIG. 3 represents an exemplary configuration of user devices (e.g., mobile device 102A or computer 102B) that may be used by a customer to access external front end system 103. For example, user device 300 may enable associated customers to perform remote interactions or mobile transactions with external front end system 103 or receive information from external front end system 103. In some embodiments, user device 300 may be a personal computing device. For example, user device 300 may be a smartphone, a laptop or notebook computer, a tablet, a multifunctional watch, a pair of multifunctional glasses, or any mobile or wearable device with computing ability, or any other device or combination of devices suitable for accessing external front end system 103.

User device 300 may include one or more processors 308 configured to execute software instructions stored in memory, such as a memory 312. Processor 308 may include one or more known processing devices, such as a microprocessor from the Pentium™ or Xeon™ family manufactured by Intel™, or the Turion™ family manufactured by AMD™, for example. The disclosed embodiments are not limited to any type of processor(s) otherwise configured to meet the computing demands required of different components of system 100. Memory 312 may store one or more software programs 314 that when executed by processor 308 perform known Internet-related communication, content display processes, and other interactive processes for customers. For instance, user device 300 may execute a browser or related mobile display software that generates and displays interfaces including content on a display device 302 included in, or in communication with, user device 300. User device 300 may be a mobile device that executes mobile device applications and/or mobile device communication software, included in programs 314, that allows user device 300 to communicate with interconnection service device 116 and other components via communication network 114, to generate and display content in interfaces via display device 302. The disclosed embodiments are not limited to any particular configuration of user device 300. User device 300 may include any arrangement of one or more computing devices configured to perform one or more operations consistent with disclosed embodiments.

User device 300 may be configured to store, in memory 312, one or more operating systems that perform known operating system functions when executed by processor 308. By way of example, the operating systems may include Microsoft Windows™, Unix™, Linux™, Android™, Apple™ Mac OS operating systems, iOS, Chrome OS, or other types of operating systems. Accordingly, disclosed embodiments may operate and function with computer systems running any type of operating system. User device 300 may also include communication software stored in memory 312 that, when executed by processor 308, provides communications with communication network 114, such as Web browser software, tablet or smart handheld device networking software, etc.

Display device 302 may include, for example, a liquid crystal displays (LCD), a light emitting diode screens (LED), an organic light emitting diode screen (OLED), a touch screen, and other known display devices. Display device 302 may display various information to customers, drivers and merchants. For example, display device 302 may display an interactive interface enabling customers, drivers and merchants to operate user device 300 to perform certain aspects of the disclosed methods. Display device 302 may display touchable or selectable options for customers, drivers and merchants to select and may receive customer selection of options through a touch screen.

User device 300 includes I/O devices 304 that allows to send and receive information or interact with customers, drivers and merchants or another device. For example, I/O devices 304 may include various input/output devices, such as a keyboard, a mouse-type device, a gesture sensor, an action sensor, a physical button, switch, microphone, touch-screen panel, stylus, etc., that may be manipulated by customers, drivers and merchants to input information using user device 300. I/O devices 304 may also include an audio output device, such as a speaker configured to provide sound and audio feedback to customers, drivers and merchants operating user device 300. In some embodiments, I/O devices 304 may include a light emitting component, such as a LED or other component capable of providing a visible signal to customers, drivers and merchants. I/O devices 304 may also include haptic output devices, to provide haptic feedback to customers, drivers and merchants. I/O devices 304 may also include one or more communication modules (not shown) for sending and receiving information from other components in system 100 by, for example, establishing wired or wireless connectivity between user device 300 and external front end system 103. I/O devices 304 may include radio frequency, infrared, or other near-field communication interfaces, for communicating with other devices associated with communication system. Exemplary communication modules of I/O devices 304 may include, for example, a short-range or near field wireless communication modem, a Wi-Fi™ communication modem, or a cellular communication modem. I/O devices 304 may include a transceiver or transmitter configured to communicate using one or more wireless technologies/protocols that may include, without limitation, cellular (e.g., 3G, 4G, etc.) technology, Wi-Fi™ hotspot technology, RFID, near-field communication (NFC) or BLUETOOTH® technologies, etc. More generally, any uni- or bi-directional communication technology known to one of ordinary skill in the art may be implemented in user device 300 to exchange information with external front end system 103.

As described above, user device 300 may be a device that executes mobile applications for performing operations consistent with disclosed embodiments. Thus, in some embodiments, programs 314 stored on user device 300 may include one or more software applications 316 installed thereon, that enable user device 300 to communicate with external front end system 103 and perform aspects of the disclosed methods. For example, user device 300 may connect to external front end system 103 by using browser software to access and receive information or perform other operations associated with an internet service provider.

According to an exemplary embodiment, software applications 316 associated with system 100 may be installed on user device 300, as shown in FIG. 3. For example, external front end system 103 may receive a request from user device 300 to download one or more software applications 316. In one embodiment, external front end system 103 may receive the request from a customer associated with user device 300 using a web browser application installed on user device 300 respectively. In another embodiment, external front end system 103 may receive the request to download one or more software applications 316 associated with external front end system 103 onto user device 300 from a webpage or another portal associated with external front end system 103 accessed via, e.g., user device 300. In this embodiment, external front end system 103 may store software instructions corresponding to one or more software applications 316 in a remote database (not shown). For responding to the download request, external front end system 103 may receive additional information from user device 103 regarding the particular device specifications of user device 300 to enable user device 300 to download software instructions corresponding to the particular specifications. Alternatively, external front end system 103 may push a download request link to user device 300 or transmit software code corresponding to one or more software applications 316 directly to user device 300 in, for example, an e-mail, a text or short message service (SMS) message, a prompt through an app, or other suitable method. User device 300 may receive the software code related to one or more software applications 316 to download and install the software code.

Figure 4:
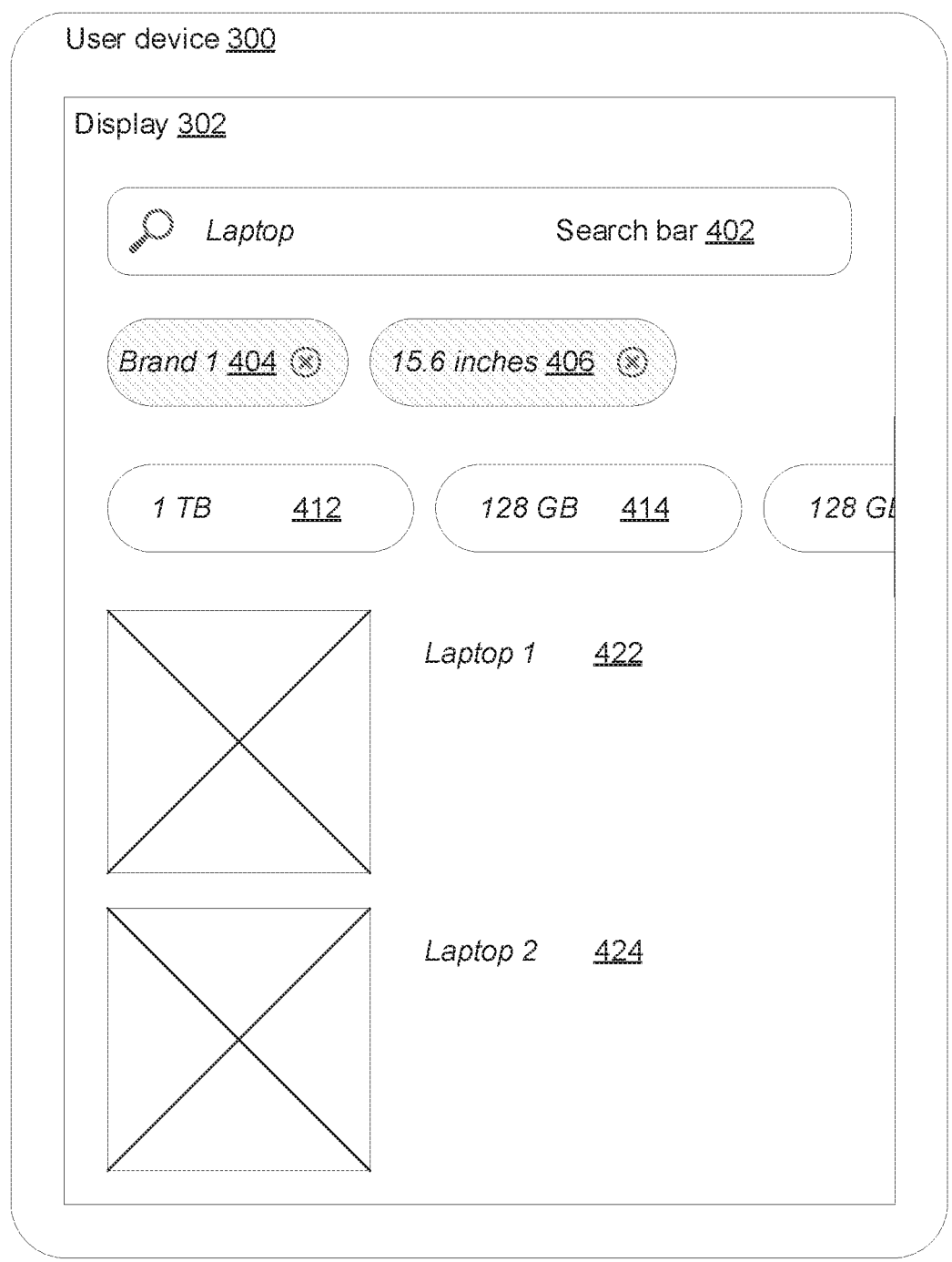
FIG. 4 depicts an exemplary visual navigation system displayed on an exemplary user device, consistent with disclosed embodiments.

FIG. 4 depicts an exemplary visual navigation system displayed on an exemplary user device, consistent with disclosed embodiments. As discussed previously, due to space limitations on some user devices, it may be difficult for customers to find filters to narrow down search results when accessing external front end system 103. Furthermore, the amount of filters offered to the customer may be overwhelming, thereby reducing their engagement rate. Accordingly, in some embodiments, external front end system 103 may be configured to display, on user device 300, a limited number of selectable attributes related to a single filter at a time to aid the customer in navigating through search result in a more efficient and accessible manner. This may be achieved, for example, by determining a filter sequence with a plurality filters based in order based on the importance of each filter.

In the example illustrated in FIG. 4, the user has entered the term 'laptop' into search bar 402. However, because 'laptop' is a very large query, the user would conventionally be presented with an overwhelmingly large amount of filters based on a large variety of attributes. In this exemplary illustration, however, the user is presented with a single filter relating only to the storage capacity of the laptop, consistent with disclosed embodiments. In particular, the user is presented with a first selectable attribute 412 (1 TB storage capacity) and a second selectable attribute 414 (128 GB storage capacity), although any number of selectable attributes may be displayed. Upon selection of one of selectable attributes 412 or 414, external front end system 103 may add the selected attribute to a record of selected attribute and narrow down the amount of search results 422 and 424 that are displayed accordingly. Additionally, external front end system may selectably display previously selected attributes 404 (Brand 1) and 406 (15.6 Inches) for removal, should the customer decide that they do not want a product with that attribute. Further, external front end system 103 may also cause user device 300 to display a subsequent filter with yet another plurality of selectable attributes. External front end system 103 may repeat these steps upon selection of subsequent filters until there are no more filters in the filter sequence.

Figure 5A:
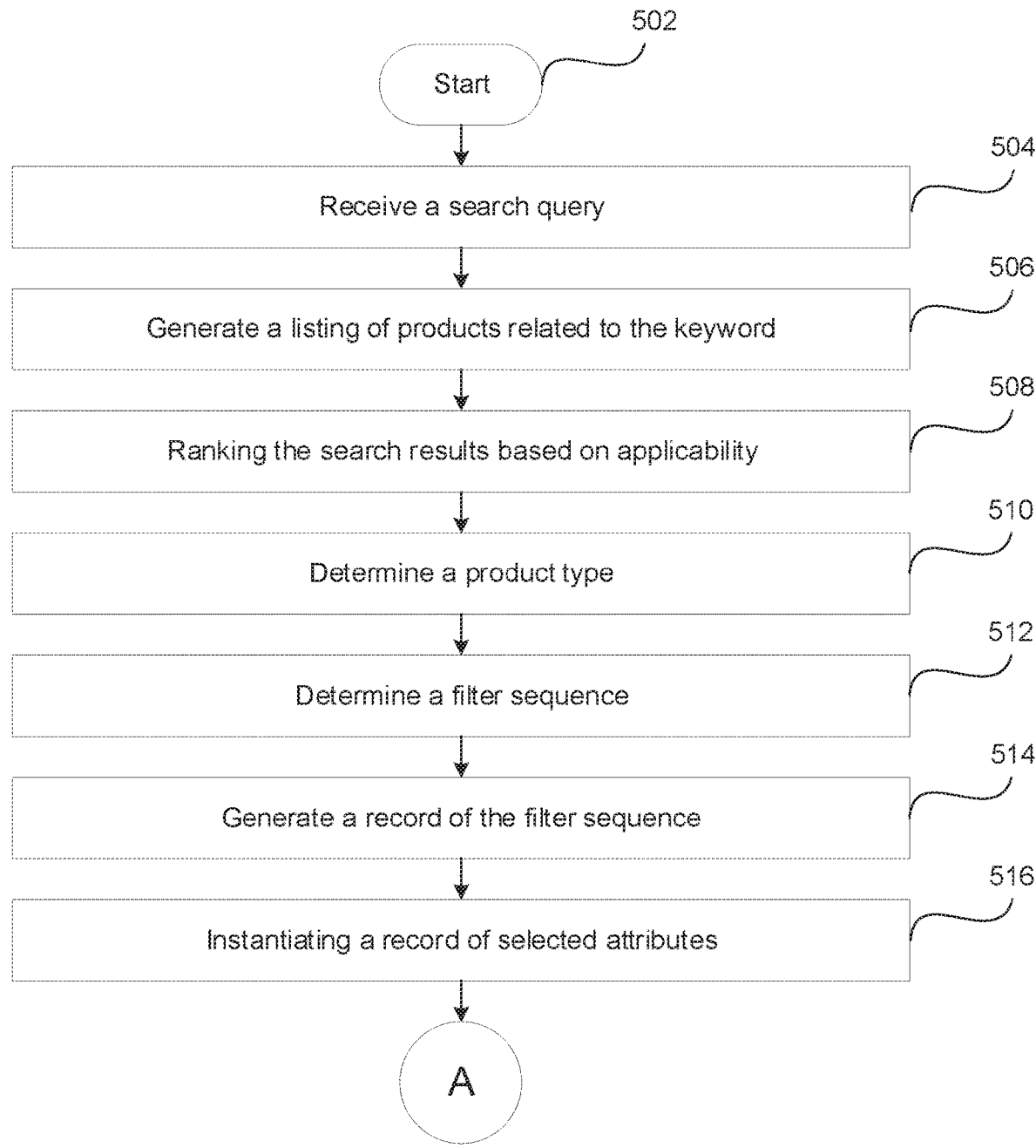
FIGS. 5A and 5B depict a detailed flowchart of an exemplary process for providing visual navigation during online shopping, consistent with disclosed embodiments.
Figure 5B:
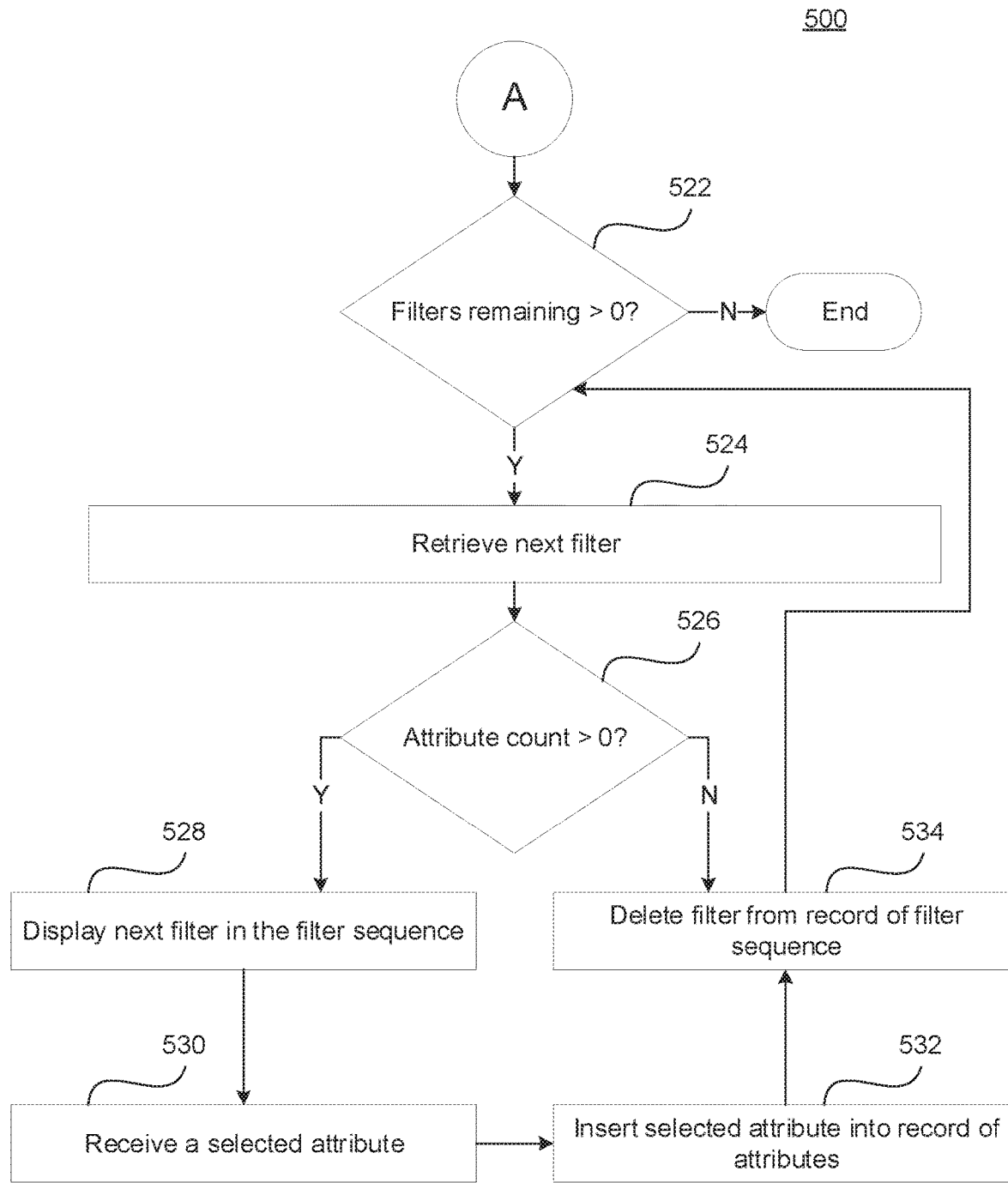

FIGS. 5A and 5B depict a detailed flowchart of an exemplary process for providing visual navigation during online shopping, consistent with disclosed embodiments. The process begins at step 504. In step 504, external front end system 103 may receive a search query from user device 300 through, for example, a network associated with system 100. The search query may include at least one keyword or a selection one or more categories of products and/or product types. For example, in FIG. 4, the customer may enter a search query for a laptop by entering 'laptop' into search bar 402, and user device 300 will transmit the query to external front end system 103.

At step 506, external front end system 103 may generate a listing of related products, or search results, based on the entered keyword or selection received from user device 300. The generation of the listing of products may be achieved through a search engine (e.g., on external front end system 103), for example, that may produce a relevant set of search results that may fulfill the customer's query. In some embodiments, external front end system 103 may consult an index of product data for a plurality of products contained in at least one data structure (not shown) associated with system 100. For example, each product in the index may include a webpage associated with the product that may be purchased through external front end system. In some embodiments, each the product data for each product may include keywords discovered within the webpage, content contained in the webpage, a freshness of the page (i.e., how recently the page has been updated), user engagement rate of the page, or any other collectible form of data associated with the product. In some embodiments, external front end system 103 may be configured to detect when the associated product data for each product contains the keyword or content related to the keyword and, if so, may include the product in the listing of products.

At step 508, external front end system 103 may then rank each product in the listing of products based on their applicability, and/or relativity, to the at least one entered keyword, which may be determined based on any number of factors. For example, in some embodiments, each product in the listing of products may be ranked based on their engagement rates relative to one another, which external front end system 103 may retrieve from at least one data structure (not shown) associated with system 100. An engagement rate may include any number of metrics related to user interaction with the particular product, such as a viewing rate of the product page, a purchase rate of the product, or a comment and/or review rate of the product. In some embodiments, external front end system 103 may also be configured to weigh the engagement rate with other factors, such as customer reviews, seller reliability, or other applicable metrics when ranking the listing of products based on applicability. Other factors that can be used may include a detected language of the search query, a previous search history associated with the user, and a location and/or device type associated with the user device that made the query. In some embodiments, any of the above-described factors and data may be input into an algorithm that external front end system 103 may execute to rank each product in the listing of products. At step 510, external front end system 103 may then determine a product type based at least on the product types of one or more of the ranked products in the listing of products.

At step 512, external front end system 103 may determine a filter sequence based on the determined product type. In some embodiments, each product type may be associated with at least one filter sequence. The filter sequence may include, for example, an order of filters that has been predetermined. For example, in some embodiments, an individual or a team of individuals may define the filter sequence for a particular product type, or another subsystem associated with system 100 may be configured to determine the filter sequence. Upon determination, the filter sequence may be and inserted into at least one data structure (not shown) associated with system 100, and external front end system 103 may be configured to retrieve the predetermined filter sequence from the at least one data structure.

In some embodiments, however, the order of filters in a filter sequence may not be predetermined, and external front end system 103 may be configured to determine a filter sequence based on historical filter data associated with the product type. For example, external front end system 103 retrieve historical filter data from at least one data structure (not shown) associated with system 100. The historical filter data may include, for example, an engagement rate for each filter in a plurality of filters associated with the product type, a query rate for a plurality of attributes associated with each filter in the plurality of filters, or any other metric associated with customer interest in certain filters or attributes related to the product type. For example, external front end system 103 may be configured to determine how often users use a given filter (e.g., when customers use 'storage capacity' or 'size' to narrow search results), or how often customers search for particular attributes (e.g., when customers search 'laptop with 1 TB' or '15.6 inch laptop'). In some embodiments, this may include the extraction of attributes from a historical record of queries under the product type and the computation of a frequency score for each extracted attribute. In some embodiments, external front end system 103 may also extract attributes included in the titles of products across all products mapped to a particular product type and compute a frequency score and/or positioning score (i.e., where the attribute is positioned in each title). Based on one or more of these factors, external front end system 103 may be configured to generate the order of filters in the filter sequence. For example, in some embodiments, external front end system 103 may place attributes with a higher frequency scores and/or positioning scores before attributes with a lower frequency score when generating the filter sequence.

At steps 514 and 516, external front end system 103 may be configured to generate a first record of the filter sequence and instantiate a record of selected attributes, respectively, consistent with the present disclosure. In some embodiments, the first record may be used to track the filters in the filter sequence as well as which filters have been used at any point during process 500, whereas the second record may be used to track which attributes the customer has selected throughout process 500. For example, external front end system 103 may be configured to access the first and second records to determine the current status of process 500 and/or modify the first and second records in response to receiving a selection from user device 300.

After step 516, process 500 may proceed to step 522 (in FIG. 5B). At step 522, external front end system 103 may determine whether a next filter exists in the filter sequence. External front end system may, for example, consult the first record of the filter sequence to determine whether any filters are left in the filter sequence. If the next filter does not exist (i.e., all filters in the filter sequence have been exhausted), the process 500 terminates, as the search results may no longer be narrowed using the filters in the filter sequence. If it is determined that the next filter does exist, however, external front end system 103 may retrieve the next filter at step 524. Once the next filter is retrieved, process 500 may proceed to step 526. At step 526, external front end system 103 may determine whether at least one available attribute in the filter exists. An attribute may be available if, upon a selection and insertion of the attribute into the second record of selected attributes, at least one product associated with the selected attributes in the second record would exist. For example, in FIG. 4, if a customer has already selected attributes 404 (Brand 1) and 406 (15.6 inches), external front end system 103 may determine if any products exist with selected attribute 404, selected attribute 406, and at least one of the selectable attributes in the next filter. If so, external front end system 103 will determine that the at least one selectable attribute is available. If not, external front end system 103 may delete the filter from the first record at step 534, and process 500 will return to step 522 to proceed with respect to a subsequent filter in the filter sequence.

In some embodiments, however, if external front end system 103 determines that a next filter exists and that at least one available attribute in the next filter exists at steps 522 and 526, then the next filter meets a condition for display, and process 500 proceeds to step 528. At step 528, external front end system 103 may display the next filter in the filter sequence on user device. The filter displayed may include a plurality of selectable attributes, such as attributes 412 (1 TB) and 414 (128 GB), associated with a single characteristic of the product type (e.g., storage space, brand, size, price, etc.). Displaying the selectable attribute may include a selectable icon including a description of the attribute, a visual representation of the attribute, or both. For example, for selections for attributes regarding storage capacity may include short descriptors (e.g., 1 TB' or '128 GB'), as a visual representation of this attribute would be unhelpful to the customer. However, for selections of more physical attributes, such as color or size, the selections may include images of a representative product having the selectable attribute (e.g., an image of a red laptop or a black laptop).

At this time, the user may select one or more of the selectable attributes. User device 300 may transmit a selection to external front end system 103 immediately upon clicking, touching on a touch screen, or otherwise selecting a single attribute (one-click) or may transmit the selection after selecting one or more attributes and selecting a confirmation option (multi-selection). Upon selection of at least one of the selectable attributes, user device 300 may transmit the selection to external front end system 103. At step 530, external front end system 103 may receive the transmitted selection. Upon receiving the selection, external front end system may 103 insert the selected attribute into the second record of selected attributes at step 532 and delete the corresponding filter from the first record of the filter sequence at step 534. Then, process 500 returns to step 522. As illustrated in FIG. 5B, steps 522-534 may be repeated any number of times so long as at least one filter exists in the second record exists. In other words, steps 522-534 may occur once in a filter sequence of only one filter, and may repeat indefinitely in a filter sequence with an unlimited number of filters.

In some embodiments, external front end system 103 may also be configured to display an option to remove a previously selected attribute from the second record. As illustrated in FIG. 4, where the user has already selected 'Brand 1' and '15.6 inches', external front end system 103 may display selectable icons 404 and 406 including an option to remove the selection (e.g., a selectable 'X' symbol). In some embodiments, upon selection of an option to remove a previous selection, external front end system 103 may receive the request to remove the selected attribute and delete the selected attribute in the second record. In some embodiments, however, external front end system 103 may also be configured to reinsert the associated filter into the first record at any point in the filter sequence. Similarly, in some embodiments, external front end system 103 may also be configured to display an option to skip the currently displayed filter. By employing a 'skip' option, the customer may proceed along process 500 if they wish not to narrow the search results using the displayed filter. Upon receiving a request to skip the filter, external front end system 103 may delete the displayed filter from the first record of the filter sequence.

In some embodiments, external front end system 103 may be configured to cause user device to display a listing of products associated with the selected attributes. For example, referring to FIG. 4, external front end system 103 may display products 422 and 424 if they are associated with selected attributes 404 and 406. In some embodiments, external front end system 103 display this listing at the conclusion of process 500, i.e., when the filter sequence has been exhausted. In some embodiments, however, external front end system may update the listing of products displayed in real time based on the status of process 500. For example, external front end system 103 may display the listing of products associated with the second record immediately upon the selection of an attribute and its subsequent insertion into the second record of selected attributes.

While the present disclosure has been shown and described with reference to particular embodiments thereof, it will be understood that the present disclosure can be practiced, without modification, in other environments. The foregoing description has been presented for purposes of illustration. It is not exhaustive and is not limited to the precise forms or embodiments disclosed. Modifications and adaptations will be apparent to those skilled in the art from consideration of the specification and practice of the disclosed embodiments. Additionally, although aspects of the disclosed embodiments are described as being stored in memory, one skilled in the art will appreciate that these aspects can also be stored on other types of computer readable media, such as secondary storage devices, for example, hard disks or CD ROM, or other forms of RAM or ROM, USB media, DVD, Blu-ray, or other optical drive media.

Computer programs based on the written description and disclosed methods are within the skill of an experienced developer. Various programs or program modules can be created using any of the techniques known to one skilled in the art or can be designed in connection with existing software. For example, program sections or program modules can be designed in or by means of .Net Framework, .Net Compact Framework (and related languages, such as Visual Basic, C, etc.), Java, C++, Objective-C, HTML, HTML/AJAX combinations, XML, or HTML with included Java applets.

Moreover, while illustrative embodiments have been described herein, the scope of any and all embodiments having equivalent elements, modifications, omissions, combinations (e.g., of aspects across various embodiments), adaptations and/or alterations as would be appreciated by those skilled in the art based on the present disclosure. The limitations in the claims are to be interpreted broadly based on the language employed in the claims and not limited to examples described in the present specification or during the prosecution of the application. The examples are to be construed as non-exclusive. Furthermore, the steps of the disclosed methods may be modified in any manner, including by reordering steps and/or inserting or deleting steps. It is intended, therefore, that the specification and examples be considered as illustrative only, with a true scope and spirit being indicated by the following claims and their full scope of equivalents.

What is claimed is:

1. A computer-implemented system for streamlined product searching, the system comprising:
    a memory storing instructions; and
    at least one processor configured to execute the instructions to:
        receive, from a user device, a search query comprising at least one keyword;
        generating a listing of related products based on the keyword;
        ranking each related product based on applicability;
        determining a product type of at least the highest ranking related product;
        determine a filter sequence associated with the product type, the filter sequence comprising an order of filters;
        generate a first record comprising the filter sequence, and store the first record in at least one data structure;
        instantiating a second record of selected attributes, and store the second record in the at least one data structure;
        display, on the user device, a first filter in the filter sequence comprising a first plurality of selectable attributes, wherein displaying the selectable attribute may include a selectable icon including a description of the attribute, a visual representation of the attribute, or both;
        receive, from the user device, a first selected attribute from the first filter;
        delete the first filter from the first record;
        insert the first selected attribute in the second record;
        determine, based on consulting the first and second records, whether a second filter in the filter sequence meets a condition for display;
        if the second filter meets the condition for display:
            display on the user device, the second filter comprising a second plurality of selectable attributes;
            receive, from the user device, a second selected attribute from the second filter;
            delete the second filter from the first record; and
            insert the second selected attribute in the second record; and
        display, on the user device, a listing of products associated with the selected attributes in the second record and a recommendation for a similar product based on a machine learning analysis.

2. The computer-implemented system of claim 1, wherein the at least one processor is further configured to, if the second filter does not meet the condition for display:
    determine whether a third filter in the filter sequence meets the condition for display; and
    if the third filter meets the condition for display:
        display, on the user device, the third filter comprising a third plurality of selectable attributes; and
        receive, from the user device, a third selected attribute from the third filter
        delete the third filter from the first record; and
        insert the third selected attribute in the second record.

3. The computer-implemented system of claim 1, wherein determining that a filter in a plurality of filters meets the condition for display comprises:
    consulting the first record to determine if the filter exists; and
    determining that at least one available attribute in the filter exists.

4. The computer-implemented system of claim 3, wherein an attribute is available if, upon a selection and insertion of the attribute into the second record, at least one product associated with one or more selected attributes in the second record exists.

5. The computer-implemented system of claim 1, wherein, for at least one filter in the filter sequence, the selectable attribute comprise a visual representation of the attribute.

6. The computer-implemented system of claim 1, wherein the at least one processor is further configured to:
display, for each selected attribute in the second record, an option to remove the selected attribute from the second record;
receive a request to remove the selected attribute in the second record; and
delete the selected attribute in the second record.

7. The computer-implemented system of claim 1, wherein determining the filter sequence comprises retrieving the filter sequence from the at least one data structure.

8. The computer-implemented system of claim 1, wherein determining the filter sequence comprises:
retrieving, from at least one database, historical filter data for a plurality of filters comprising:
an engagement rate for each filter in the plurality of filters; and
a query rate for a plurality of attributes associated with each filter in the plurality of filters; and
generating the order of filters based on the historical filter data.

9. The computer-implemented system of claim 1, wherein ranking each related product based on applicability comprises:
retrieving, in the at least one data structure, historical query data associated with the at least one keyword, the historical query data comprising an engagement rate associated with each related product; and
ranking each related product based on the engagement rates associated with each related product.

10. The computer-implemented method of claim 1, wherein the at least one processor is further configured to:
display, for each displayed filter in the filter sequence, an option to skip the displayed filter;
receive a request to skip the displayed filter; and
delete the displayed filter from the first record.

11. A computer-implemented method for streamlined product searching, comprising:
receiving, from a user device, a search query comprising at least one keyword;
generating a listing of related products based on the keyword;
ranking each related product based on applicability;
determining a product type of at least the highest ranking related product;
determining a filter sequence associated with the product type, the filter sequence comprising an order of filters;
generating a first record comprising the filter sequence, and store the first record in at least one data structure;
instantiating a second record of selected attributes, and store the second record in the at least one data structure;
displaying, on the user device, a first filter in the filter sequence comprising a first plurality of selectable attributes, wherein displaying the selectable attribute may include a selectable icon including a description of the attribute, a visual representation of the attribute, or both;
receiving, from the user device, a first selected attribute from the first filter;
deleting the first filter from the first record;
inserting the first selected attribute in the second record;
determining, based on consulting the first and second records, whether a second filter in the filter sequence meets a condition for display;
if the second filter meets the condition for display:
displaying on the user device, the second filter comprising a second plurality of selectable attributes;
receiving, from the user device, a second selected attribute from the second filter;
deleting the second filter from the first record; and
inserting the second selected attribute in the second record; and
displaying, on the user device, a listing of products associated with the selected attributes in the second record and a recommendation for a similar product based on a machine learning analysis.

12. The computer-implemented system of claim 11, further comprising, if the second filter does not meet the condition for display:
determine whether a third filter in the filter sequence meets the condition for display; and
if the third filter meets the condition for display:
display, on the user device, the third filter comprising a third plurality of selectable attributes; and
receive, from the user device, a third selected attribute from the third filter
delete the third filter from the first record; and
insert the third selected attribute in the second record.

13. The computer-implemented method of claim 11, wherein determining that a filter in a plurality of filters meets the condition for display comprises:
consulting the first record to determine if the filter exists; and
determining that at least one available attribute in the filter exists.

14. The computer-implemented method of claim 13, wherein an attribute is available if, upon a selection and insertion of the attribute into the second record, at least one product associated with one or more selected attributes in the second record exists.

15. The computer-implemented method of claim 11, wherein, for at least one filter in the filter sequence, the selectable attribute values comprise a visual representation of the attribute.

16. The computer-implemented method of claim 11, further comprising:
display, for each selected attribute in the second record, an option to remove the selected attribute from the second record;
receive a request to remove the selected attribute in the second record; and
delete the selected attribute in the second record.

17. The computer-implemented method of claim 11, wherein determining the filter sequence comprises retrieving the filter sequence from the at least one data structure.

18. The computer-implemented method of claim 11, wherein determining the filter sequence comprises:
retrieving, from at least one database, historical filter data for a plurality of filters comprising:
an engagement rate for each filter in the plurality of filters; and
a query rate for a plurality of attributes associated with each filter in the plurality of filters; and
generating the order of filters based on the historical filter data.

19. The computer-implemented method of claim 11, wherein ranking each related product based on applicability comprises:
  retrieving, in the at least one data structure, historical query data associated with the at least one keyword, the historical query data comprising an engagement rate associated with each related product; and
  ranking each related product based on the engagement rates associated with each related product.

* * * * *